(12) United States Patent
Ueda et al.

(10) Patent No.: US 8,105,732 B2
(45) Date of Patent: Jan. 31, 2012

(54) DIRECT OXIDATION FUEL CELL

(75) Inventors: Hideyuki Ueda, Osaka (JP); Hiroaki Matsuda, Osaka (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 12/431,270

(22) Filed: Apr. 28, 2009

(65) Prior Publication Data

US 2009/0280377 A1    Nov. 12, 2009

(30) Foreign Application Priority Data

May 9, 2008  (JP) .................................. 2008-123650

(51) Int. Cl.
*H01M 4/02* (2006.01)
(52) U.S. Cl. ........................................................ 429/523
(58) Field of Classification Search ........... 429/523–534
See application file for complete search history.

(56) References Cited

U.S. PATENT DOCUMENTS

| | | | |
|---|---|---|---|
| 6,350,539 B1 * | 2/2002 | Wood et al. .................... | 429/450 |
| 7,749,639 B2 * | 7/2010 | Ichikawa et al. .............. | 429/478 |
| 2006/0269824 A1 * | 11/2006 | Hampden-Smith et al. .... | 429/40 |
| 2006/0292434 A1 * | 12/2006 | Hampden-Smith et al. .... | 429/40 |
| 2007/0178367 A1 * | 8/2007 | Ueda et al. ...................... | 429/44 |

FOREIGN PATENT DOCUMENTS

| | | |
|---|---|---|
| JP | 2005-183368 | 7/2005 |
| JP | 2005-353541 | 12/2005 |
| JP | 2006-107877 | 4/2006 |
| JP | 2006-134886 | 5/2006 |

* cited by examiner

*Primary Examiner* — Phuong Dinh
(74) *Attorney, Agent, or Firm* — McDermott Will & Emery LLP (57) ABSTRACT

The direct oxidation fuel cell of the invention includes at least one unit cell, the unit cell including: a membrane-electrode assembly including an anode, a cathode, and an electrolyte membrane interposed therebetween; an anode-side separator; and a cathode-side separator. The cathode includes a first cathode catalyst layer, a diffusion layer being in contact with the cathode-side separator, and an intermediate layer disposed therebetween. The intermediate layer includes a second cathode catalyst layer and a porous composite layer, the porous composite layer containing a hydrophobic material and an electron-conductive material. The anode-side separator has a fuel flow channel, and the cathode-side separator has an oxidant flow channel. At least a portion of the intermediate layer facing the upstream portion of the fuel flow channel includes the second cathode catalyst layer, and at least portions of the intermediate layer facing the midstream and downstream portions of the fuel flow channel include the porous composite layer.

9 Claims, 6 Drawing Sheets

DIRECT OXIDATION FUEL CELL

FIELD OF THE INVENTION

The invention relates to direct oxidation fuel cells directly using fuel without reforming it into hydrogen. Specifically, the invention relates to improvements to electrodes for direct oxidation fuel cells.

BACKGROUND OF THE INVENTION

With the advancement of ubiquitous network society, the demand for mobile devices such as cellular phones, notebook personal computers, and digital still cameras has been remarkably increased. As the power source for such mobile devices, fuel cells, which need no recharging and will operate as long as fuel is supplied, are expected to be put into practical use as early as possible.

Among such fuel cells, direct oxidation fuel cells, which generate electric power by directly supplying an organic fuel such as methanol or dimethyl ether to an anode for oxidation without reforming the fuel into hydrogen, have been attracting attention, for which active research and development have been performed. The reasons for this include that organic fuels have a high theoretical energy density and are easy to store, and that organic fuels can simplify the fuel cell system.

Direct oxidation fuel cells include a unit cell comprising a membrane-electrode assembly (hereinafter referred to as an "MEA") sandwiched between separators. The MEA generally includes a solid polymer electrolyte membrane and an anode and a cathode sandwiching the electrolyte membrane, the anode and the cathode each including a catalyst layer and a diffusion layer. Such direct oxidation fuel cells generate power by supplying fuel and water to the anode and supplying oxidant such as oxygen to the cathode.

For example, the electrode reactions of a direct methanol fuel cell (hereinafter referred to as a "DMFC"), which uses methanol as the fuel, are as follows.

Anode: $CH_3OH + H_2O \rightarrow CO_2 + 6H^+ + 6e^-$
Cathode: $3/2O_2 + 6H^+ + 6e^- \rightarrow 3H_2O$ Specifically, at the anode, methanol reacts with water to produce carbon dioxide, protons, and electrons. The protons produced at the anode migrate through the electrolyte membrane to reach the cathode, and the electrons migrate through an external circuit to reach the cathode. At the cathode, the protons and the electrons having migrated through the external circuit combine with oxygen to produce water.

However, there have been several problems in putting DMFCs into practical use.

One of them is a problem regarding the durability. In the interior of the cathode catalyst layer and/or the interface between the cathode catalyst layer and the cathode diffusion layer, with the passage of power generation time, water produced by reaction and/or water transferred from the anode will accumulate in the form of liquid. The accumulated water causes the diffusibility of an oxidant in the cathode to deteriorate and thus the cathodic concentration overvoltage to increase. This is considered to be a primary cause of the initial deterioration of the power generation performance of DMFCs.

This initial deterioration is strongly influenced by methanol crossover (hereinafter referred to as "MCO"). MCO is the phenomenon of permeation of unreacted methanol through the electrolyte membrane to reach the cathode. In other words, in the cathode catalyst layer, oxidation reaction of crossover methanol occurs simultaneously with a reaction that normally occurs at the cathode, namely, reduction reaction of oxygen. For this reason, particularly when high-concentration methanol is used as the fuel, the amount of MCO increases with the passage of power generation time, causing the cathodic activation overvoltage to increase significantly. Moreover, carbon dioxide produced by the reaction causes the diffusibility of the oxidant to further deteriorate, and thus the power generation performance significantly deteriorates.

The initial deterioration as described above tends to occur in the cathode-side power generation region facing the upstream portion of the fuel flow channel where the amount of MCO is large. This initial deterioration becomes notable with the decrease of the three-phase interfaces where the catalyst phase, the electrolyte phase, and the oxygen phase coexist, the three-phase interfaces serving as electrode reaction sites.

In order to address these problems, there has been proposed a method of increasing the catalyst content in a DMFC relative to that in a solid polymer electrolyte fuel cell (PEFC), thereby to increase the surface area of the catalyst (i.e., catalyst reaction sites) per unit area of the catalyst layer. However, an increase in the catalyst content leads to an increase in the thickness of the catalyst layer itself, so that it becomes difficult for the oxidant to reach the reaction sites in the interior of the catalyst layer. As a result, contrary to the expectation, the power generation performance deteriorates.

Hence, as a solution to the above-discussed problems, many proposals have been made to improve the structure of the cathode catalyst layer itself. For example, Japanese Laid-Open Patent Publications Nos. 2005-353541 and 2006-107877 disclose providing the cathode catalyst layer with a plurality of through pores or vertical apertures. Techniques disclosed in these documents intend, by way of providing a plurality of through pores or vertical apertures, to allow the oxidant to be smoothly supplied into a deep portion of the catalyst layer as well as to allow water to be smoothly drained from a deep portion of the catalyst layer even when the thickness of the cathode catalyst layer is increased.

Japanese Laid-Open Patent Publication No. 2006-134886 discloses providing an electrode substrate carrying a catalyst layer with a hydrophilic region and a hydrophobic region that are separated from each other. The technique disclosed in this document intends, by way of configuring the catalyst layer as described above, to facilitate the draining of water from the cathode, thereby to prevent clogging of pores of the membrane with the water.

Japanese Laid-Open Patent Publication No. 2005-183368 discloses setting the thicknesses of the anode catalyst layer and the cathode catalyst layer to 20 μm or more, and providing at least one of the catalyst layers with pores having a pore size of 0.3 to 2.0 μm such that the volume of these pores is equal to or greater than 4% of the total pore volume. The technique disclosed in this document intends, by way of configuring the catalyst layer as described above, to allow liquid fuel and oxidant to be smoothly supplied to the reaction sites in the interior of each electrode without sacrificing the electron conductivity and the proton conductivity.

However, even with the use of the configurations of the conventional techniques as described above, in the cathode-side power generation region facing the upstream portion of the fuel flow channel where the amount of MCO is large, it is impossible to ensure sufficient amount of three-phase interfaces serving as electrode reaction sites. Moreover, in the cathode-side power generation region facing the midstream and downstream portions of the fuel flow channel where the amount of MCO is reduced, it is impossible to maintain the smooth supply of oxidant to the interior of the catalyst layer and the smooth draining of water from a deep portion of the catalyst layer. Therefore, by using the above-described conventional techniques, it is difficult to obtain a catalyst layer that can reduce the cathodic overvoltage.

Specifically, in the case of the techniques represented by Japanese Laid-Open Patent Publications Nos. 2005-353541 and 2006-107877, since a plurality of through pores or vertical apertures are provided, in other words, since large defects are present in the cathode-side power generation region facing the upstream portion of the fuel flow channel where the amount of MCO is large, an appropriate amount of the three-phase interfaces serving as electrode reaction sites cannot be provided and thus the cathodic overvoltage in this region increases. In the cathode-side power generation region facing the midstream and downstream portions of the fuel flow channel where the amount of MCO is reduced, the oxidant readily reaches the three-phase interfaces serving as electrode reaction sites through the plurality of through pores or vertical apertures provided in the interior of the catalyst layer. As such, in the initial stage of power generation when there is not much condensed water accumulated at the cathode, the power generation performance is comparatively good. However, with the passage of power generation time, condensed water is increasingly accumulated in the interior of the through pores or vertical apertures, making it difficult to reliably supply the oxidant into a deep portion of the cathode catalyst layer. Therefore, it is predicted that the power generation performance will drop abruptly.

In the technique disclosed in Japanese Laid-Open Patent Publication No. 2006-134886, the electrode structure is not designed with taking into account the influence of the MCO amount distribution along the flowing direction of the fuel. Because of this, the cathode-side power generation region facing the upstream portion of the fuel flow channel becomes deficient in the three-phase interfaces serving as electrode reaction sites, and thus the cathodic overvoltage will increase.

In the technique disclosed in Japanese Laid-Open Patent Publication No. 2005-183368, the lower limit of the thickness of the catalyst layer, and the size and volume of the pores are merely defined. Therefore, it is difficult to say that an optimum pore structure is realized throughout the entire catalyst layer, the optimum pore structure having all of the followings: the diffusibility of fuel or oxidant, the ability of draining carbon dioxide or water being a reaction product, the electron conductivity, and the proton conductivity.

The invention intends to solve the above-described conventional problems and to provide a direct oxidation fuel cell excellent in power generation performance and durability.

BRIEF SUMMARY OF THE INVENTION

The direct oxidation fuel cell of the invention includes at least one unit cell, the unit cell including: a membrane-electrode assembly including an anode, a cathode, and an electrolyte membrane interposed between the anode and the cathode; an anode-side separator being in contact with the anode; and a cathode-side separator being in contact with the cathode. The anode-side separator has a fuel flow channel for supplying fuel to the anode, and the cathode-side separator has an oxidant flow channel for supplying oxidant to the cathode. The cathode includes a first cathode catalyst layer being in contact with the electrolyte membrane, a cathode diffusion layer being in contact with the cathode-side separator, and an intermediate layer disposed between the first cathode catalyst layer and the cathode diffusion layer. The intermediate layer includes a second cathode catalyst layer being in contact with the first cathode catalyst layer and a porous composite layer being in contact with the cathode diffusion layer, the porous composite layer containing a hydrophobic material and an electron-conductive material. At least a portion of the intermediate layer facing the upstream portion of the fuel flow channel includes the second cathode catalyst layer, and at least portions of the intermediate layer facing the midstream and downstream portions of the fuel flow channel include the porous composite layer.

In a preferred embodiment of the invention, the portion of the intermediate layer facing the upstream portion of the fuel flow channel includes only the second cathode catalyst layer, and the portions of the intermediate layer facing the midstream and downstream portions of the fuel flow channel include only the porous composite layer.

In another preferred embodiment of the invention, the portion of the intermediate layer facing the upstream portion of the fuel flow channel includes only the second cathode catalyst layer, the portions of the intermediate layer facing the midstream and downstream portions of the fuel flow channel further include the second cathode catalyst layer, and a catalyst content in the second cathode catalyst layer is decreased from the upstream side toward the downstream side of the fuel flow channel. The total content of the hydrophobic material and the electron-conductive material in the porous composite layer is increased from the midstream side toward the downstream side of the fuel flow channel.

In yet another preferred embodiment of the invention, the portions of the intermediate layer facing the upstream, midstream and downstream portions of the fuel flow channel includes the second cathode catalyst layer and the porous composite layer; and the catalyst content in the second cathode catalyst layer is decreased from the upstream side toward the downstream side of the fuel flow channel, and the total content of the hydrophobic material and the electron-conductive material contained in the porous composite layer is increased from the upstream side toward the downstream side of the fuel flow channel.

Preferably, the catalyst content per unit area in the second cathode catalyst layer is smaller than the catalyst content per unit area in the first cathode catalyst layer. Preferably, the porosity of the second cathode catalyst layer is greater than the porosity of the first cathode catalyst layer.

Preferably, the hydrophobic material includes fluorocarbon resin. Preferably, the electron-conductive material includes an electrically conductive carbon black.

Preferably, the cathode diffusion layer includes an electrically conductive porous substrate, and the intermediate layer is directly formed on the electrically conductive porous substrate.

According to the invention, in the portion of the cathode-side power generation region facing the upstream portion of the fuel flow channel where the amount of MCO is large, it is possible to provide a sufficient amount of three-phase interfaces serving as electrode reaction sites; and in the portions of the cathode-side power generation region facing the midstream and downstream portions of the fuel flow channel where the amount of MCO is reduced, it is possible to maintain the smooth supply of oxidant into the interior of the catalyst layer and the smooth draining of water from a deep portion of the catalyst layer. As such, the cathodic overvoltage can be reduced. In short, the invention enables the provision of a direct oxidation fuel cell excellent in both power generation performance and durability.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A direct oxidation fuel cell of the invention includes at least one unit cell, the unit cell including: a membrane-electrode assembly including an anode, a cathode, and an electrolyte membrane interposed between the anode and the cathode; an anode-side separator being in contact with the anode; and a cathode-side separator being in contact with the cathode. The cathode includes a first cathode catalyst layer being in contact with the electrolyte membrane, a cathode diffusion layer being in contact with the cathode-side separator, and an intermediate layer disposed between the first cathode catalyst layer and the cathode diffusion layer. The intermediate layer includes a second cathode catalyst layer being in contact with the first cathode catalyst layer and a porous composite layer being in contact with the cathode diffusion layer, the porous composite layer containing a hydrophobic material (or a water-repellent binder material) and an electron-conductive material. The anode-side separator has a fuel flow channel for supplying fuel to the anode, and the cathode-side separator has an oxidant flow channel for supplying oxidant to the cathode. At least a portion of the intermediate layer facing the upstream portion of the fuel flow channel includes the second cathode catalyst layer, and at least portions of the intermediate layer facing the midstream and downstream portions of the fuel flow channel include the porous composite layer.

Figure 1:
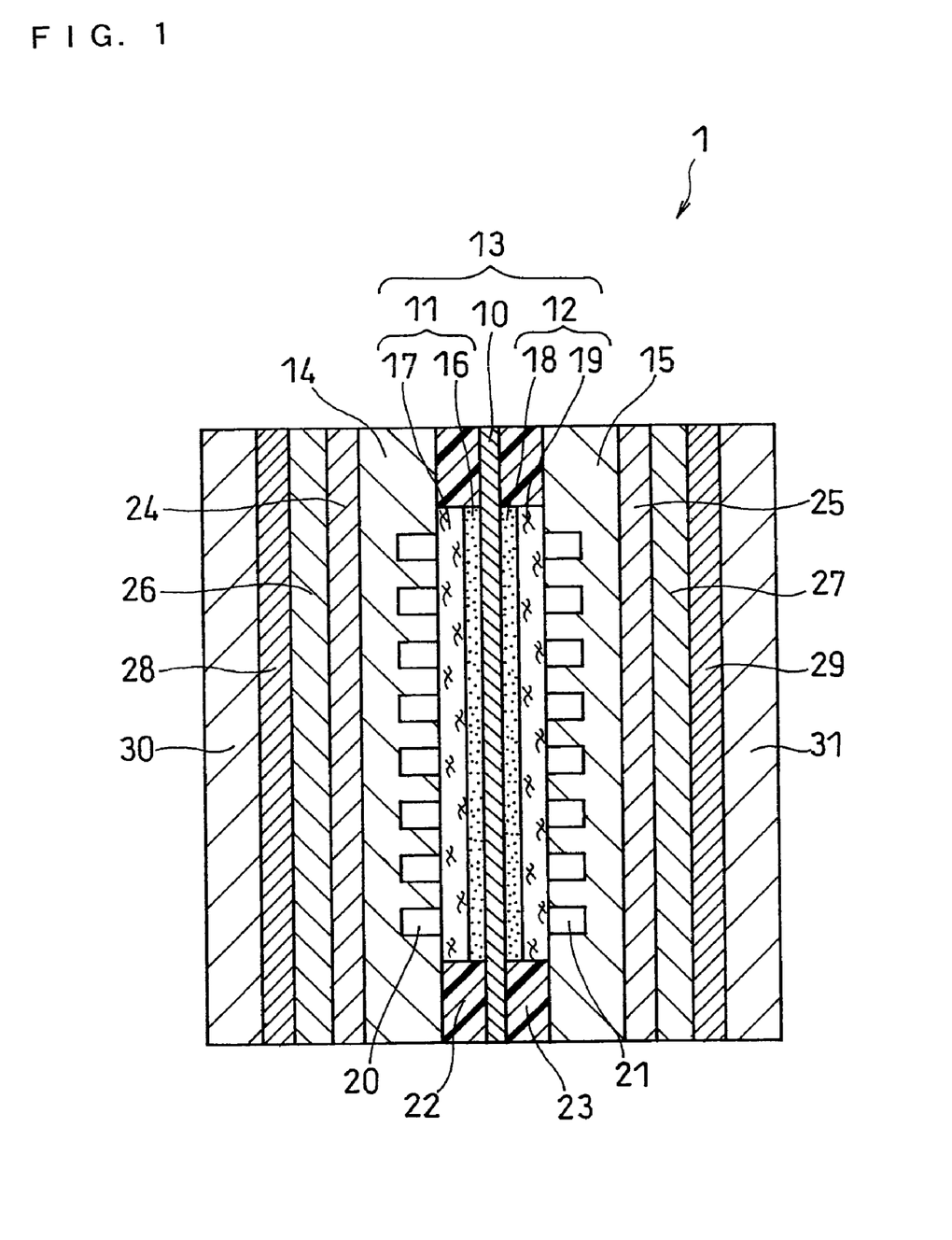
FIG. 1 is a longitudinal sectional view schematically illustrating the structure of a unit cell included in a direct oxidation fuel cell according to one embodiment of the invention.

FIG. 1 is a longitudinal sectional view of a unit cell included in a fuel cell according to one embodiment of the invention.

A unit cell 1 of FIG. 1 includes a membrane-electrode assembly (MEA) 13 comprising an electrolyte membrane and an anode 11 and a cathode 12 sandwiching the electrolyte membrane 10, and an anode-side separator 14 and a cathode-side separator 15 sandwiching the MEA 13.

The anode 11 includes an anode catalyst layer 16 being in contact with the electrolyte membrane 10 and an anode diffusion layer 17 being in contact with the anode-side separator 14. The cathode 12 includes a first cathode catalyst layer 18 being in contact with the electrolyte membrane 10, a cathode diffusion layer 19 being in contact with the cathode-side separator 15, and an intermediate layer (not shown) disposed between the first cathode catalyst layer 18 and the cathode diffusion layer 19.

The anode-side separator 14 has, on the surface facing the anode 11, a fuel flow channel 20 for supplying fuel and draining unused fuel and a reaction product to and from the anode. The cathode-side separator 15 has, on the surface facing the cathode 12, an oxidant flow channel 21 for supplying oxidant and draining unused oxidant and a reaction product to and from the cathode.

Around the anode 11 and the cathode 12, gaskets 22 and 23 are disposed, respectively, so as to sandwich the electrolyte membrane 10, in order to prevent external leakage of the fuel, oxidant, and reaction products. Further, in the unit cell 1 of FIG. 1, the separators 14 and 15 are sandwiched between current collector plates 24 and 25, sheet heaters 26 and 27, insulator plates 28 and 29, and end plates 30 and 31, respectively. The unit cell 1 is secured by clamping means (not shown).

The anode catalyst layer 16 is mainly composed of: electrically conductive carbon particles carrying catalyst metal fine particles, or catalyst metal fine particles; and a polymer electrolyte. As the catalyst metal contained in the anode catalyst layer 16, for example, platinum-ruthenium (Pt—Ru) alloy fine particles may be used. The polymer electrolyte contained in each catalyst layer is preferably the same material as that constituting the electrolyte membrane 10.

As the anode diffusion layer 17, an electrically conductive porous substrate with fuel diffusibility, ability of draining carbon dioxide produced through power generation, and electron conductivity may be used. Examples of such a conductive porous substrate include carbon paper, carbon cloth, carbon felt, and the like. This conductive porous substrate may be used after being subjected to water-repellent treatment according to a known technique. Alternatively, the surface of the conductive porous substrate in the anode catalyst layer 16 side may be provided with a water-repellent carbon layer (not shown).

The electrolyte membrane 10 is preferably excellent in proton conductivity, heat resistance, chemical stability, and other properties. There is no particular limitation on the material constituting the electrolyte membrane 10 (polymer electrolyte), as long as the electrolyte membrane 10 has the above-listed properties.

There is no particular limitation on the material of the separators 14 and 15, as long as the separators 14 and 15 have hermeticity, electron conductivity, and electrochemical stability. There is no particular limitation also on the shapes of the fuel flow channel 20 and the oxidant flow channel 21.

As the constituent materials of the current collectors 24 and 25, the sheet heaters 26 and 27, the insulator plates 28 and 29, and the end plates 30 and 31, any know materials in the art may be used.

Next, the configuration of the cathode 12 is described with reference to drawings.

As described above, the cathode 12 includes the first cathode catalyst layer 18, the cathode diffusion layer 19, and the intermediate layer disposed therebetween. The intermediate layer includes a second cathode catalyst layer being in contact with the first cathode catalyst layer and a porous composite layer being in contact with the cathode diffusion layer. At least a portion of the intermediate layer facing the upstream portion of the fuel flow channel includes the second cathode catalyst layer. At least portions of the intermediate layer facing the midstream and downstream portions of the fuel flow channel include the porous composite layer.

EMBODIMENT 1

Figure 2:
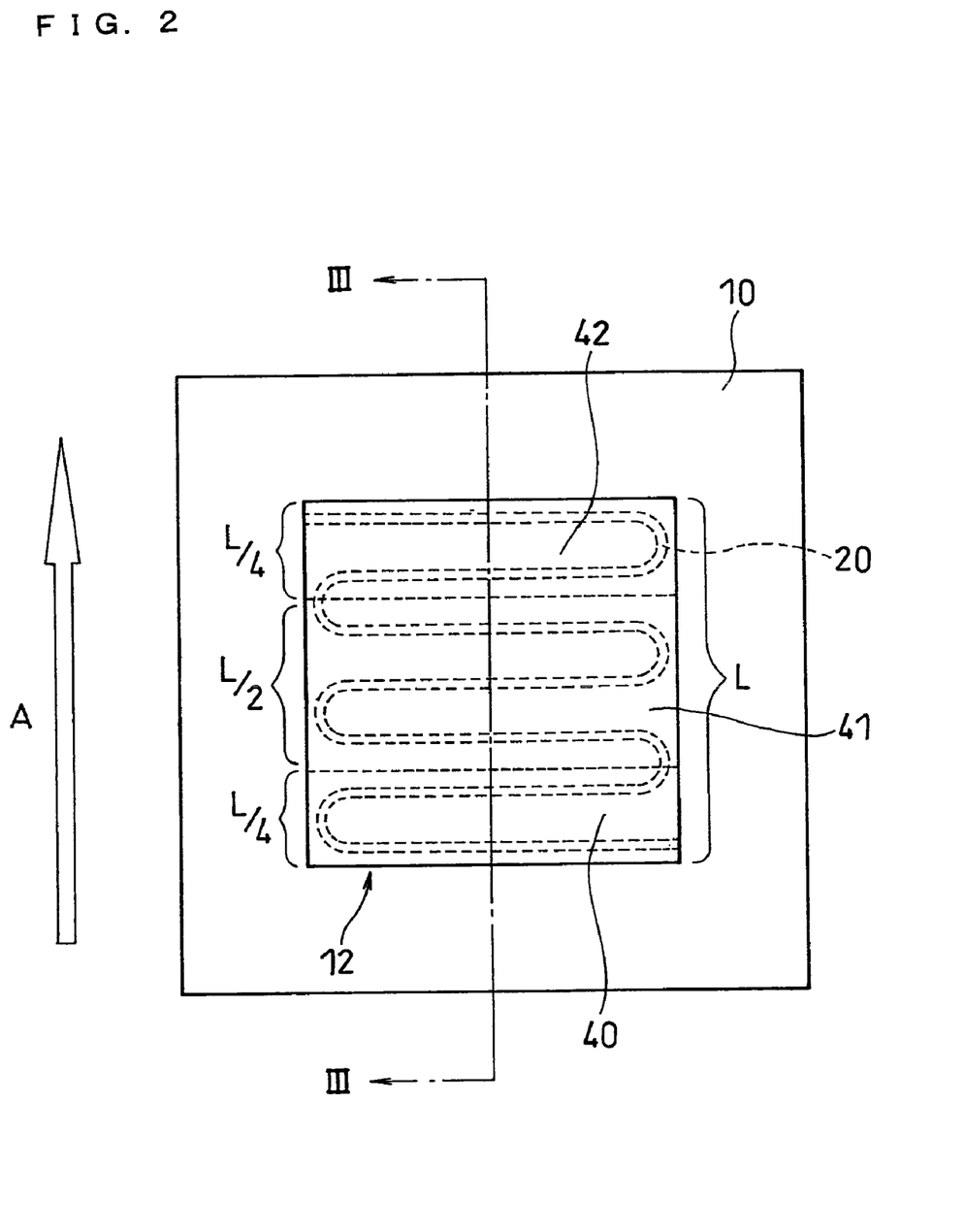
FIG. 2 is a front view schematically illustrating a cathode included in the direct oxidation fuel cell according to one embodiment of the invention.
Figure 3:
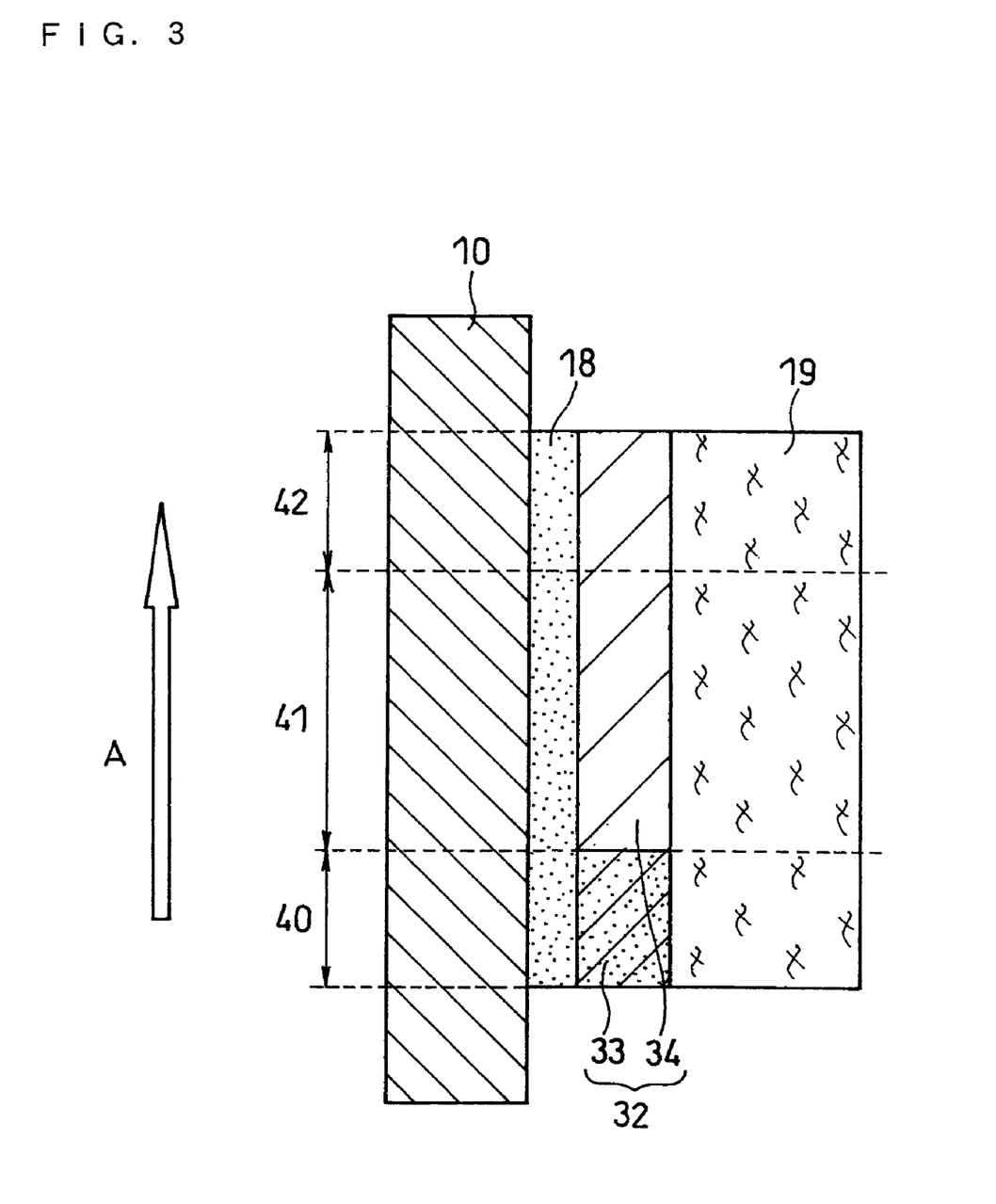
FIG. 3 is a sectional view of the cathode taken along the line III-III indicated in FIG. 2.

FIG. 2 is a front view schematically illustrating the cathode 12 included in the fuel cell according to one embodiment of the invention, and FIG. 3 is a sectional view taken along the line III-III in FIG. 2. In FIGS. 2 and 3, the cathode 12 and the electrolyte membrane 10 carrying the cathode 12 are depicted. In FIG. 2, the serpentine fuel flow channel 20, which the cathode 12 faces, is also shown in dotted lines.

The first cathode catalyst layer 18 is mainly composed of: electrically conductive carbon particles carrying catalyst metal fine particles, or catalyst metal fine particles; and a polymer electrolyte. As the catalyst metal included in the first cathode catalyst layer 18, for example, Pt fine particles may be used. The polymer electrolyte contained in the first cathode catalyst layer 18 is preferably the same material as that constituting the electrolyte membrane 10.

As the cathode diffusion layer 19, an electrically conductive porous substrate with oxidant diffusibility, ability of draining water produced through power generation, and electron conductivity may be used. Examples of such a conductive porous substrate include carbon paper, carbon cloth, carbon felt, and the like. This conductive porous substrate may be used after being subjected to water-repellent treatment according to a known technique.

It is preferable that the intermediate layer as described below is directly formed on the conductive porous substrate.

In this embodiment, as illustrated in FIGS. 2 and 3, a portion 40 of the intermediate layer 32 facing the upstream portion of the fuel flow channel (i.e., a region being located in the upstream side of the fuel flow channel 20 and having an area equal to one fourth of the area of the intermediate layer) includes only the second cathode catalyst layer 33. A portion 41 of the intermediate layer 32 facing the midstream portion of the fuel flow channel (i.e., a region being located in the midstream side of the fuel flow channel 20 and having an area equal to one half of the area of the intermediate layer) and a portion 42 of the intermediate layer 32 facing the downstream portion of the fuel flow channel (i.e., a region being located in the downstream side of the fuel flow channel 20 and having an area equal to one fourth of the area of the intermediate layer) include only the porous composite layer 34.

Here, as illustrated in FIG. 2, when the length of a side of the cathode 12 parallel to arrow A indicating the overall flow direction of fuel flowing from the upstream side toward the downstream side of the fuel flow channel 20 is denoted by L, namely, the length of a side of the intermediate layer 32 parallel to arrow A is denoted by L, the portion (upstream portion) 40 of the intermediate layer 32 facing the upstream portion of the fuel flow channel 20 is a region of the intermediate layer 32 being located so as to face the upstream portion of the fuel flow channel 20 and having a length of the side parallel to arrow A of L/4.

The portion (midstream portion) 41 of the intermediate layer 32 facing the midstream portion of the fuel flow channel 20 is a region of the intermediate layer 32 being located so as to face the midstream portion of the fuel flow channel 20 and having a length of the side parallel to arrow A of L/2.

The portion (downstream portion) 42 of the intermediate layer 32 facing the downstream portion of the fuel flow channel 20 is a region of the intermediate layer 32 being located so as to face the downstream portion of the fuel flow channel 20 and having a length of the side parallel to arrow A of L/4.

As described above, the portion of the intermediate layer facing the upstream portion of the fuel flow channel where the amount of MCO is large includes the second cathode catalyst layer, and the portions of the intermediate layer facing the midstream and downstream portions of the fuel flow channel where the amount of MCO is reduced include the porous composite layer. Since the portion of the intermediate layer facing the upstream portion of the fuel flow channel includes the second cathode catalyst layer, it is possible to ensure the number of catalyst reaction sites required for allowing the electrode reaction (oxygen reduction reaction) and the crossover methanol oxidation reaction to proceed simultaneously. Moreover, since the portions of the intermediate layer facing the midstream and downstream portions of the fuel flow channel include the porous composite layer, it is possible to improve the interface bonding between the first cathode catalyst layer and the cathode diffusion layer. As such, the accumulation of a large amount of water between the first cathode catalyst layer and the cathode diffusion layer can be prevented, which enables an efficient supply of oxidant to the first cathode catalyst layer and an efficient draining of water from a deep portion of the first cathode catalyst layer.

In other words, providing the intermediate layer configured as described above makes it possible to optimize the electrode structure and the number of electrode reaction sites as well as to maintain the efficient supply of oxidant and the efficient draining of reaction product. As a result, the cathodic overvoltage can be reduced and the durability of the fuel cell can be improved.

The material constituting the second cathode catalyst layer 33 may be different from the material constituting the first cathode catalyst layer 18, but more preferably is the same.

For the hydrophobic material included in the porous composite layer 34, any material may be used without particular limitation as long as the material has water repellency and binding property. Among such materials, a hydrophobic material mainly composed of fluorocarbon resin having a chemically stable C—F bond is preferred. When fluorocarbon resin is used as the hydrophobic material, the surface of the porous composite layer can be a surface that shows little interaction with other molecules, namely, a water-repellent surface. As such, the interiors of pores in the porous composite layer are unlikely to be clogged with the water present in the cathode, and as a result, a more efficient supply of oxidant and a more efficient draining of water can be realized.

Examples of the fluorocarbon resin include polytetrafluoroethylene (PTFE) resin, tetrafluoroethylene-hexafluoropropylene (FEP) copolymer, polyvinylidene fluoride (PVDF) resin, tetrafluoroethylene-perfluoro(alkyl vinyl ether) (PFA) copolymer, and the like.

For the electron-conductive material included in the porous composite layer, any material may be used without any particular limitation as long as the material has electron conductivity. Among such materials, an electron-conductive material mainly composed of electrically conductive carbon black is preferred. The structure of conductive carbon black (aggregates of primary particles fused together permanently) is highly developed, and moreover the specific surface area thereof is large. Accordingly, by using the conductive carbon black as the electron-conductive material, it is possible to ensure the electron conductivity, as well as to rapidly drain the water produced in the catalyst layer from the catalyst layer through the pores in the structure.

The catalyst content per unit area in the second cathode catalyst layer 33 is preferably smaller than the catalyst content per unit area in the first cathode catalyst layer 18. Specifically, the catalyst content per unit area in the first cathode catalyst layer is preferably 0.8 to 1.4 mg/cm$^2$ and the catalyst content per unit area in the second cathode catalyst layer is preferably 0.2 to 0.6 mg/cm$^2$.

With such a configuration, it is possible to avoid an unnecessary increase in the thickness of the catalyst layer due to excess use of catalyst, and to maintain the smooth supply of oxidant and the smooth draining of water to and from a deep portion of the first cathode catalyst layer.

Here, the catalyst content per unit area is a value obtained by dividing the catalyst content in a catalyst layer by the area (the projected area) of the catalyst layer calculated from the contour thereof as seen in the direction normal to the main surface of the catalyst layer.

More preferably, the porosity of the second cathode catalyst layer 33 is greater than the porosity of the first cathode catalyst layer 18. Specifically, the porosity of the first cathode catalyst layer is preferably 65% to 85%, and the porosity of the second cathode catalyst layer is preferably 86% to 95%.

With such a configuration, it is possible to further improve the permeability of oxidant through the intermediate layer. As a result, it is possible to ensure the number of catalyst reaction sites required for allowing the electrode reaction and the crossover methanol oxidation reaction to proceed simultaneously, as well as to ensure a smoother supply of oxidant and a smoother draining of produced water to and from a deep portion of the first cathode catalyst layer.

The porosity of the porous composite layer is preferably 50% to 80%. When the porosity of the porous composite layer is set within the range above, the porous composite layer can have adequate electron conductivity and oxidant permeability.

In the porous composite layer, the ratio of the weight of the hydrophobic material to that of the electron-conductive material is preferably 3:7 to 7:3. When the ratio of the weight of the hydrophobic material to that of the electron-conductive material is set within the range above, the porous composite layer can have adequate electron conductivity and ability of draining water.

EMBODIMENT 2

In this embodiment, the portions of the intermediate layer facing the upstream, midstream and downstream portions of the fuel flow channel include the second cathode catalyst layer, and the portion of the intermediate layer facing the upstream portion of the fuel flow channel includes the second cathode catalyst layer only. The catalyst content in the second cathode catalyst layer is decreased from the upstream side toward the downstream side of the fuel flow channel. The porous composite layer is included in the midstream and downstream portions of the intermediate layer, and the total content of the hydrophobic material and the electron-conductive material in the porous composite layer is increased from the midstream side toward the downstream side of the fuel flow channel.

Figure 4:
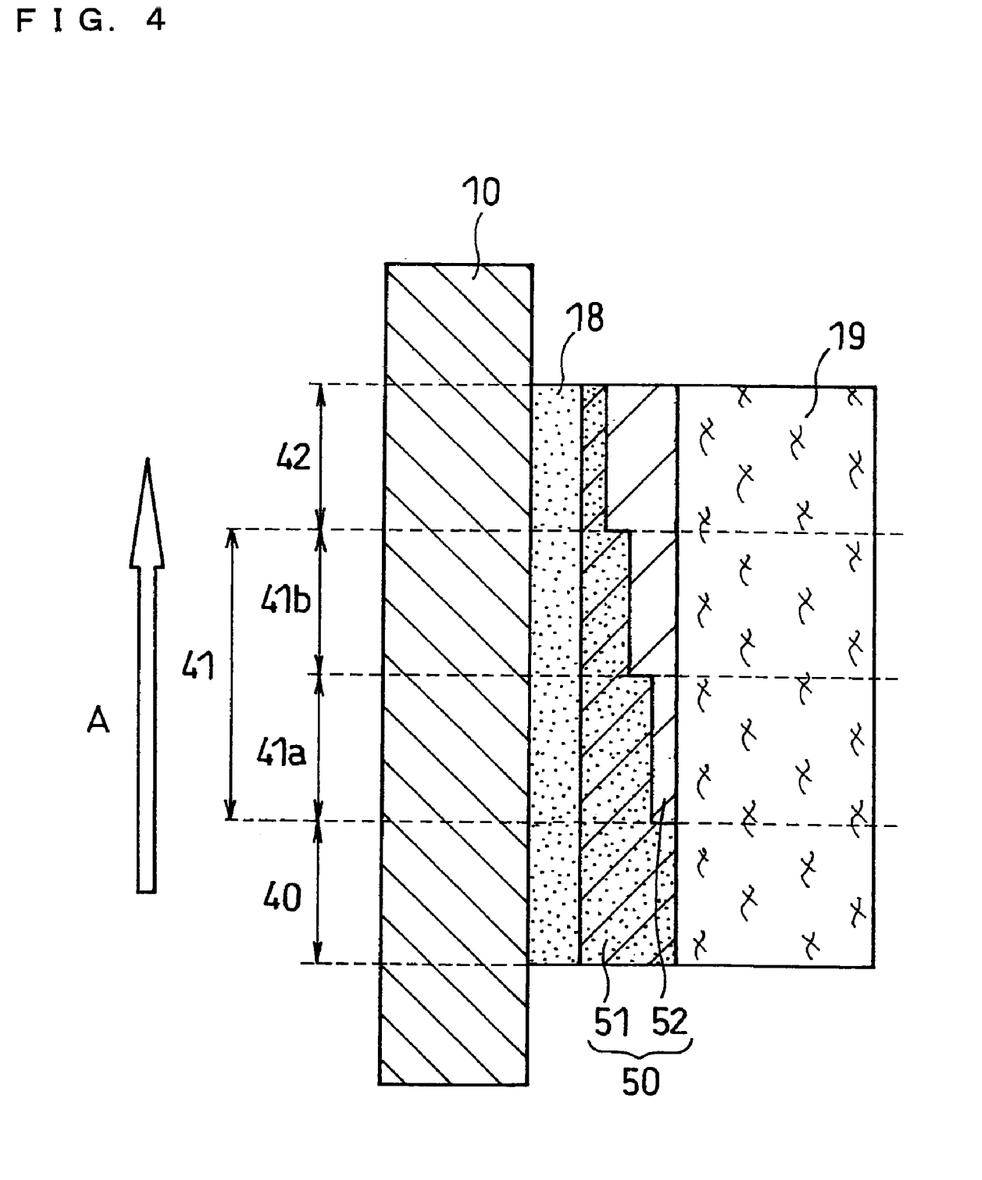
FIG. 4 is a longitudinal sectional view schematically illustrating a cathode included in a direct oxidation fuel cell according to another embodiment of the invention.

FIG. 4 illustrates the cathode included in a fuel cell according to this embodiment. As in FIG. 3, in FIG. 4, the cathode and the electrolyte membrane carrying the cathode are depicted. In FIGS. 3 and 4, the same components are denoted by the same reference numerals.

An intermediate layer 50 illustrated in FIG. 4 includes a second cathode catalyst layer 51 and a porous composite layer 52. The second cathode catalyst layer 51 is in contact with the first cathode catalyst layer 18 and faces the upstream, midstream and downstream portions of the fuel flow channel. The portion 40 of the intermediate layer 50 facing the upstream portion of the fuel flow channel includes the second cathode catalyst layer only. Here, one surface of the first cathode catalyst layer is in contact with the electrolyte membrane and the other surface thereof opposite the one surface is in contact with the second cathode catalyst layer only.

The porous composite layer 52 is in contact with the cathode diffusion layer 19, and faces the midstream and downstream portions of the fuel flow channel.

In this embodiment, the catalyst content in the second cathode catalyst layer is decreased in the direction indicated by arrow A, namely, from the upstream side toward the downstream side of the fuel flow channel. Specifically, the catalyst content per unit area in the upstream portion 40 of the intermediate layer 50, the catalyst content per unit area in the midstream portion 41 thereof, and the catalyst content per unit area in the downstream portion 42 thereof are decreased in the order of the upstream portion 40, the midstream portion 41, and the downstream potion 42.

Further, as illustrated in FIG. 4, the midstream portion 41 of the intermediate layer 50 is preferably equally divided into a first midstream portion 41a in the upstream side and a second midstream portion 41b in the downstream side. The catalyst content per unit area is preferably decreased from the first midstream portion 41a toward the second midstream portion 41b.

In the porous composite layer 52, the total content of the hydrophobic material and the electron conductive material is increased from the midstream side toward the downstream side of the fuel flow channel (i.e., in the direction indicated by arrow A). Specifically, a) the total content of the hydrophobic material and the electron conductive material per unit area in the midstream portion 41 of the intermediate layer 50 and b) the total content of the hydrophobic material and the electron conductive material per unit area in the downstream portion 42 of the intermediate layer 50 are increased in the order of the midstream portion 41 and the downstream portion 42.

Further, in the case where the midstream portion 41 is equally divided into the first midstream portion 41a and the second midstream portion 41b, the total content per unit area of the hydrophobic material and the electron conductive material is preferably increased from the first midstream portion 41a toward the second midstream portion 41b.

Here, the catalyst content per unit area in a specific portion (e.g., the portion 40 etc.) of the second cathode catalyst layer is a value obtained by dividing the catalyst content in the specific portion by the area (the projected area) of the specific portion calculated from the contour thereof as seen in the direction normal thereto.

Likewise, the total content of the hydrophobic material and the electron conductive material per unit area in a specific portion (e.g., the portion 41a etc.) of the porous composite layer is a value obtained by dividing the total content of the hydrophobic material and the electron conductive material in the specific area by the projected area of the specific portion.

The catalyst content in a specific portion of the second cathode catalyst layer 51 can be controlled, for example, by adjusting the thickness of the specific portion. Specifically, as illustrated in FIG. 4, by decreasing the thickness of the second cathode catalyst layer 51 in the order of the upstream portion 40, the first midstream portion 41a, the second midstream portion 41b, and the downstream portion 42, the catalyst content in the second cathode catalyst layer 51 can be decreased in the direction denoted by arrow A.

Likewise, the total content of the hydrophobic material and the electron conductive material in a specific portion of the porous composite layer 52 can be controlled, for example, by adjusting the thickness of the specific portion. Specifically, by increasing the thickness of the porous composite layer 52 in the order of the first midstream portion 41a, the second midstream portion 41b, and the downstream portion 42, the total content of the hydrophobic material and the electron conductive material in the porous composite layer 52 can be increased in the direction indicated by arrow A.

As described above, by decreasing the thickness of the second cathode catalyst layer (i.e., decreasing the catalyst content) from the upstream side toward the downstream side of the fuel flow channel, it is possible to suitably control the number of catalyst reaction sites required for allowing the electrode reaction and the crossover methanol oxidation reaction to proceed simultaneously, throughout the entire power generation region. Further, by including the porous composite layer in the portions of the intermediate layer facing the midstream and downstream portions of the fuel flow channel, the interface bonding between the catalyst layer and the diffusion layer can be improved, which makes it possible to prevent the accumulation of a large amount of water between the first cathode catalyst layer and the cathode diffusion layer. As a result, in particular, in the cathode-side power generation region facing the midstream and downstream portions of the fuel flow channel, the supply of oxidant to the catalyst layer and the draining of water from a deep portion of the first cathode catalyst layer can be further improved. This makes it possible to further reduce the cathodic overvoltage and further improve the durability of the fuel cell.

In this embodiment, the constituent components of the second cathode catalyst layer and the porous composite layer are the same as those in Embodiment 1.

The catalyst content in the second cathode catalyst layer may be decreased stepwise from the upstream side toward the downstream side of the fuel flow channel as illustrated in FIG. 4. Alternatively, the catalyst content may be decreased gradually or continuously from the upstream side toward the downstream side of the fuel flow channel.

The ratio of the catalyst content per unit area in the downstream portion 42 of the second cathode catalyst layer to that in the upstream portion 40 of the second cathode catalyst layer is preferably, for example, 1.3 to 3.0.

In the second cathode catalyst layer, in the case where the catalyst content per unit area is decreased gradually or continuously, the decrease rate of the catalyst content (per unit area) from the upstream side toward the downstream side of the fuel flow channel is preferably 0.05 to 0.3 mg/cm.

The effect of the invention can be further improved by decreasing the catalyst content so as to satisfy the above-described range.

In this embodiment also, it is preferable that the average catalyst content per unit area in the entire second cathode catalyst layer 51 is, as in the case of Embodiment 1, smaller than the catalyst content per unit area in the first cathode catalyst layer 18. The catalyst content per unit area in the first cathode catalyst layer 18 is preferably 0.8 to 1.4 mg/cm$^2$, and the catalyst content per unit area in the second cathode catalyst layer is preferably 0.2 to 0.6 mg/cm$^2$.

In particular, it is more preferable that in all of the upstream, midstream, and downstream portions in the intermediate layer 50, the catalyst content per unit area in each portion of the second cathode catalyst layer is smaller than the catalyst content per unit area in the corresponding portion of the first cathode catalyst layer 18. In this case also, the catalyst content per unit area in the second cathode catalyst layer is preferably 0.2 to 0.6 mg/cm$^2$.

The porosity of the second cathode catalyst layer 51 is more preferably, as in the case of Embodiment 1, greater than the porosity of the first cathode catalyst layer 18. In this embodiment also, the porosity of the first cathode catalyst layer is preferably 65% to 85%, and the porosity of the second cathode catalyst layer is preferably 86% to 95%.

In the intermediate layer 50, the porosity of the second cathode catalyst layer in the upstream portion 40, the porosity of the second cathode catalyst layer in the midstream portion 41, and the porosity of the second cathode catalyst layer in the downstream portion 42 may be the same or different. When the porosities of the second cathode catalyst layer in the upstream portion 40, the midstream portion 41, and the downstream portion 42 are different from one another, it suffices if the average porosity of the entire second cathode catalyst layer 51 is greater than the porosity of the first cathode catalyst layer. In particular, it is more preferable that each of the porosities of the second cathode catalyst layer in the upstream portion 40, the midstream portion 41, and the downstream portion 42 of the intermediate layer 50 is greater than the porosity of the first cathode catalyst layer.

In the case of forming a second cathode catalyst layer with high porosity on the cathode diffusion layer by the method of, for example, spray coating as described below, the second cathode catalyst layer can be easily formed by providing the cathode diffusion layer with a porous composite layer beforehand.

It should be noted that if the second cathode catalyst layer is formed by spray coating on the cathode diffusion layer with no porous composite layer formed thereon, part of the components contained in an ink for second cathode catalyst layer are embedded in a separate state in the interior of the cathode diffusion layer, which may cause a reduction in the electron conductivity of the second cathode catalyst layer. Further, another part of the components enter the pores in the cathode diffusion layer, which may cause a reduction in the oxidant permeability.

The total content of the hydrophobic material and the electron-conductive material in the porous composite layer may be increased, as illustrated in FIG. 4, stepwise from the upstream side toward the downstream side of the fuel flow channel. Alternatively, the total content may be increased gradually or continuously from the upstream side toward the downstream side of the fuel flow channel.

In the intermediate layer 50, the ratio of the total content of the hydrophobic material and the electron conductive material per unit area of the porous composite layer in the midstream portion 41 to that in the downstream portion 42 is preferably, for example, 1.3 to 2.6. In the case where the midstream portion 41 is divided into the first midstream portion 41a and the second midstream portion 41b, it suffices if the ratio of the total content of the hydrophobic material and the electron conductive material per unit area of the porous composite layer in the first midstream portion 41a to that in the downstream portion 42 is within the above-defined range.

In the porous composite layer, in the case where the total content of the above two materials per unit area is increased gradually or continuously, the increase rate of the foregoing total content (per unit area) from the upstream side toward the downstream side of the fuel flow channel is preferably 0.2 to 0.4 mg/cm.

The effect of the invention can be further improved by increasing the total content of the above two materials so as to satisfy the above-described range.

In this embodiment also, the porosity of the porous composite layer is preferably 50 to 80%.

EMBODIMENT 3

In this embodiment, the portions of the intermediate layer facing the upstream, midstream and downstream portions of the fuel flow channel include the second cathode catalyst layer and the porous composite layer. The catalyst content in the second cathode catalyst layer is decreased from the upstream side toward the downstream side of the fuel flow channel, and the total content of the hydrophobic material and the electron-conductive material in the porous composite layer is increased from the upstream side toward the downstream side of the fuel flow channel.

Figure 5:
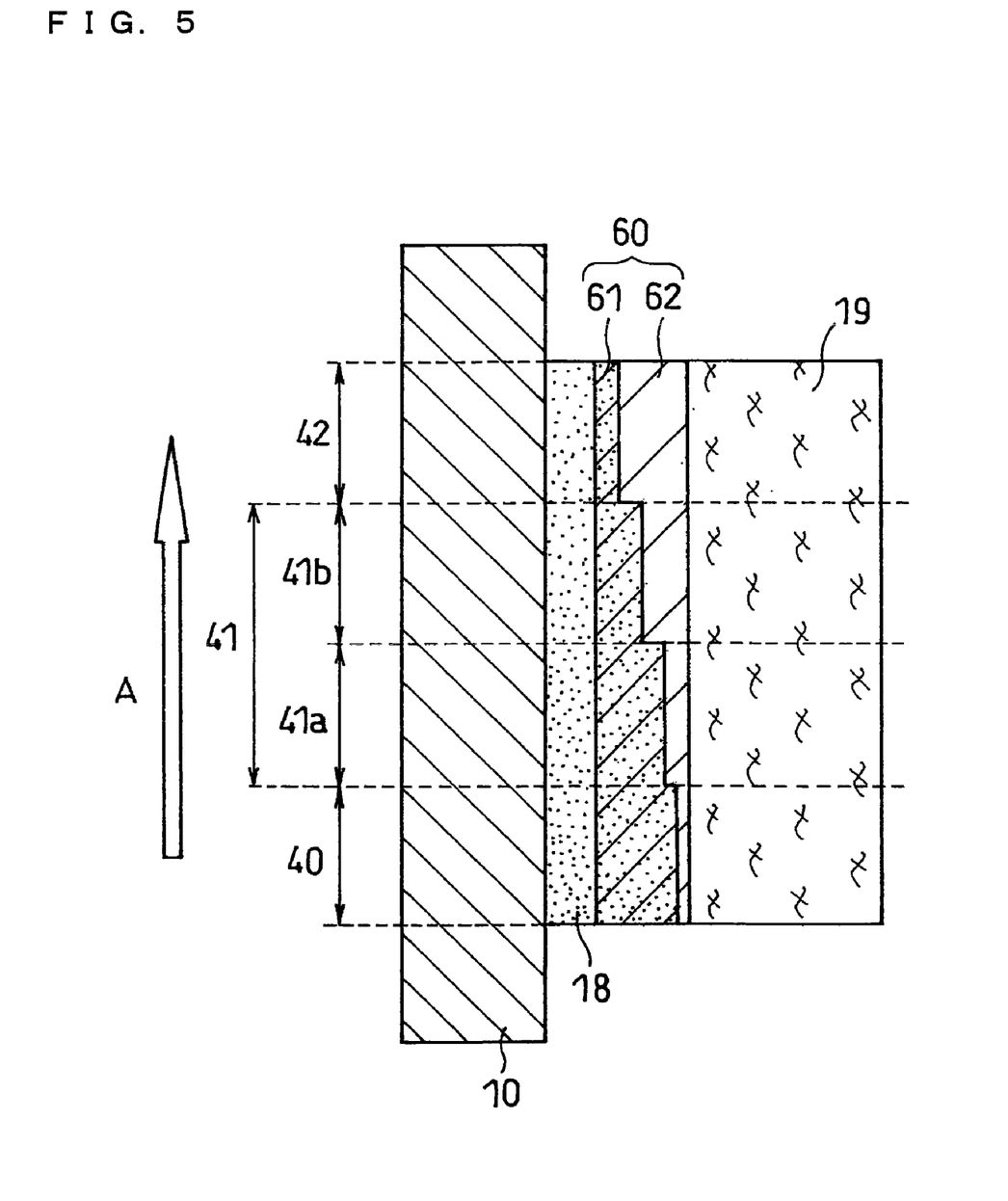
FIG. 5 is a longitudinal sectional view schematically illustrating a cathode included in a direct oxidation fuel cell according to yet another embodiment of the invention.

FIG. 5 illustrates the cathode included in a fuel cell according to this embodiment. As in FIG. 4, in FIG. 5, the cathode and the electrolyte membrane carrying the cathode are depicted. In FIGS. 4 and 5, the same components are denoted by the same reference numerals.

An intermediate layer 60 illustrated in FIG. 5 includes a second cathode catalyst layer 61 and a porous composite layer 62. The second cathode catalyst layer 61 is in contact with the first cathode catalyst layer 18 and faces the upstream, midstream and downstream portions of the fuel flow channel. Here, one surface of the first cathode catalyst layer is in contact with the electrolyte membrane and the other surface thereof opposite the one surface is in contact with the second cathode catalyst layer only.

The porous composite layer 62 is in contact with the cathode diffusion layer 19, and faces the upstream, midstream and downstream portions of the fuel flow channel. A surface of the cathode diffusion layer 19 facing the electrolyte membrane is in contact with the porous composite layer 62 only.

In this embodiment also, the catalyst content in the second cathode catalyst layer is decreased in the direction indicated by arrow A, namely, from the upstream side toward the downstream side of the fuel flow channel. In the porous composite layer, the total content of the hydrophobic material and the electron conductive material is increased from the upstream side toward the downstream side of the fuel flow channel (in the direction indicated by arrow A).

In other words, this embodiment is different from Embodiment 2 in that, unlike the intermediate layer 50 of Embodiment 2, the upstream portion 40 of the intermediate layer 60 of this embodiment includes the second cathode catalyst layer and the porous composite layer interposed between the second cathode catalyst layer and the cathode diffusion layer; but is identical thereto except for the above difference.

By providing the porous composite layer also on the upper portion 40 of the intermediate layer 60, the porous composite layer will be provided over the entire power generation region in the cathode. As such, as described above in Embodiment 2, it is possible to form a second cathode catalyst layer with high porosity over the entire power generation region in the cathode without sacrificing the electron conductivity and the oxidant permeability. This makes it possible to further reduce the cathodic overvoltage and further improve the durability of the fuel cell.

In the intermediate layer 60, the ratio of the total content of the hydrophobic material and the electron conductive material per unit area of the porous composite layer in the upstream portion 40 to that in the downstream portion 42 is preferably, as in Embodiment 2, 1.3 to 2.6.

Figure 6:
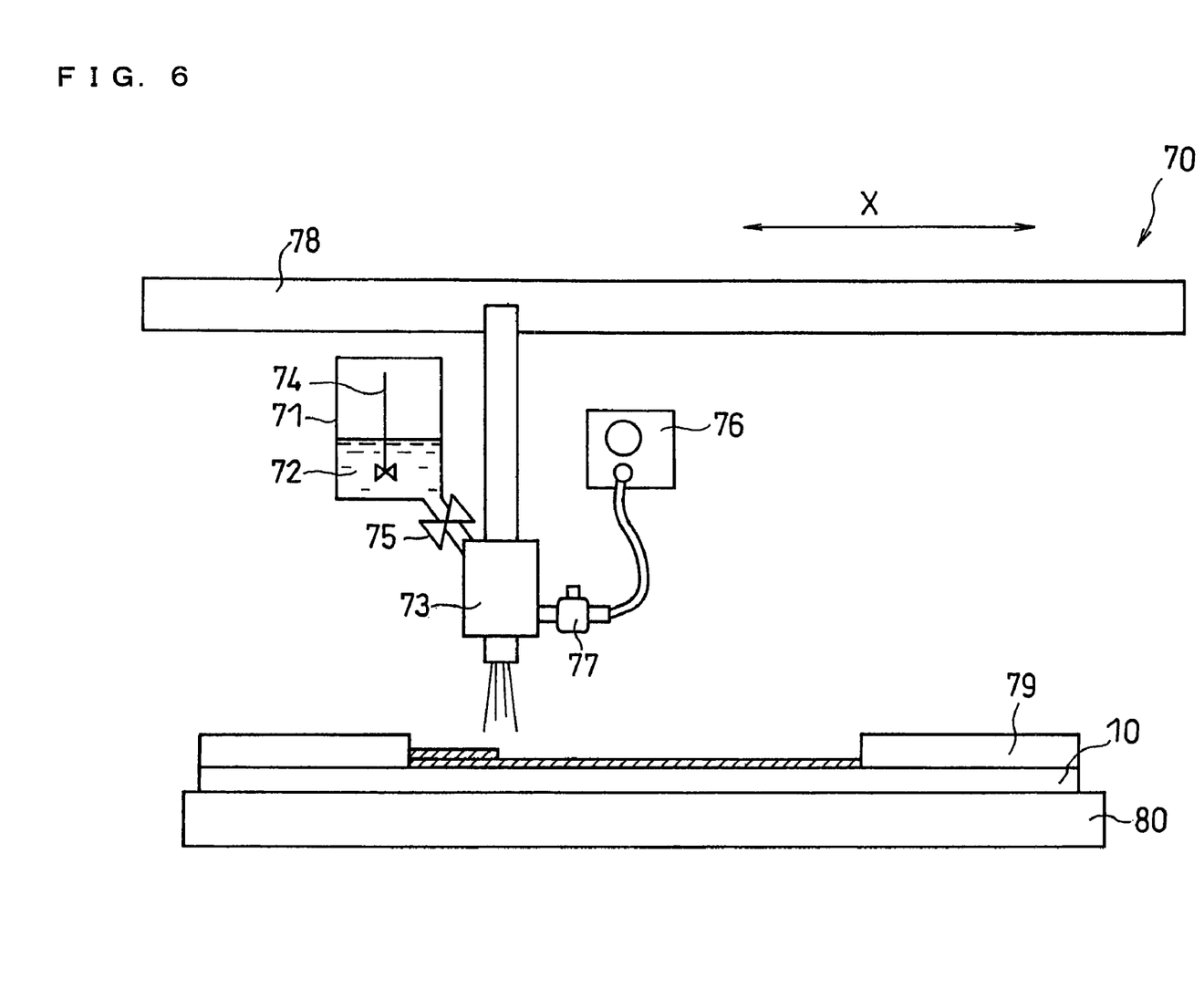
FIG. 6 is a schematic view illustrating an example of the configuration of a spray coater used for forming a cathode catalyst layer.

In the following, an exemplary method of forming a first cathode catalyst layer and a second cathode catalyst layer is described. The first cathode catalyst layer and the second cathode catalyst layer can be formed, for example, using a spray coater 70 as illustrated in FIG. 6. FIG. 6 is a schematic view illustrating the configuration of a spray coater used for forming a cathode catalyst layer. The spray coater 70 includes a tank 71 containing a cathode catalyst ink 72, and a spray gun 73 for ejecting the ink.

In the tank 71, the cathode catalyst ink 72 is constantly stirred by a stirrer 74. The cathode catalyst ink 72 is fed to the spray gun 73 through an open/close valve 75 and ejected from the spray gun 73 together with jet gas. The jet gas is fed via a gas pressure adjustor 76 and a gas flow rate adjustor 77 to the spray gun 73. As the jet gas, for example, nitrogen gas may be used.

In the coater 70 of FIG. 6, the spray gun 73 is movable by means of an actuator 78 on the plane perpendicular to the sheet of drawing, in two directions, namely, a direction along an X axis parallel to arrow X and a direction along a Y axis perpendicular to the X axis, from a desired start position and at a desired speed.

In FIG. 6, the electrolyte membrane 10 is placed below the spray gun 73, and the spray gun 73 is moved while the cathode catalyst ink 72 is ejected therefrom, whereby a first cathode catalyst layer is formed on the electrolyte membrane 10. The coating region of the cathode catalyst ink on the electrolyte membrane 10 can be adjusted by using a mask 79.

In forming a first cathode catalyst layer, it is preferable to control the surface temperature of the electrolyte membrane 10. In the coater 70, the surface temperature of the electrolyte membrane 10 is controlled by a heater 80 arranged in contact with the electrolyte membrane 10. The surface temperature is preferably 45 to 65° C.

The second cathode catalyst layer can be formed basically in the same manner as the first cathode catalyst layer. In one exemplary method, the porous composite layer is formed on the cathode diffusion layer, and then the second cathode catalyst layer is formed on the porous composite layer using the coater 70. In another exemplary method, the first cathode catalyst layer is formed, and then the second cathode catalyst layer is formed on the first cathode catalyst layer using the coater 70.

As described above, in the coater 70, the cathode catalyst ink 72 can be ejected while the spray gun 73 is moved toward a desired position. In other words, at a desired position of the cathode catalyst layer, the thickness thereof and/or the catalyst content therein can be changed. As such, the first and second cathode catalyst layers can be easily formed as desired by using the coater 70.

The porosities of the first and second cathode catalyst layers can be controlled by, for example, adjusting the ejection amount of catalyst ink, the presence or absence of ultrasonic treatment on the catalyst ink performed immediately before the spray coating, the pressure and the flow rate of the jet gas, the surface temperature of the substrate, and the like.

For example, although dependent on the composition of the catalyst ink and other conditions, the second cathode catalyst layer with high porosity can be formed by adjusting the pressure of the jet gas at the time of catalyst ink ejection within a range of 0.05 to 0.12 MPa.

A first cathode catalyst layer having a porosity smaller than the second cathode catalyst layer can be formed by, for example, although dependent on the composition of the catalyst ink and other conditions, allowing the catalyst ink to be subjected to ultrasonic treatment immediately before coating, and the pressure of the jet gas at the time of catalyst ink ejection within a range of 0.20 to 0.30 MPa.

It should be noted that the first and second cathode catalyst layers can be formed under the conditions other than the above.

The above-described catalyst ink coating may be performed by any other known method in the art.

The porous composite layer may be formed by any known method in the art. In one exemplary method, a mixture including a hydrophobic material, an electron conductive material, and a dispersion medium is mixed using a kneader, and subsequently the resultant paste is applied onto a cathode diffusion layer using a doctor blade and then dried, whereby a porous composite layer is obtained. The porosity of the porous composite layer can be controlled by, for example, adjusting the mixing time for dispersion in the kneader.

The first and second cathode catalyst layers having different porosities can be distinguished from each other by, for example, observing the cross section of the catalyst layer using a scanning electron microscope (SEM). When the porosities of the first and second cathode catalyst layers are different, each of the porosities can be measured by, for example, analyzing the pore distribution determined by a mercury intrusion method.

Alternatively, the porosities of the first and second cathode catalyst layers and the porous composite layer can be determined, for example, in the following manner.

After only a first cathode catalyst layer is formed on a predetermined substrate under the same conditions as those described above for forming the first cathode catalyst layer, the porous portion in the catalyst layer is subjected to measurement by a mercury intrusion method. From the data thus measured, the porosity of the first cathode catalyst layer can be determined.

As for the second cathode catalyst layer and the porous composite layer, the porosity can be determined in the same manner as described above.

The invention is hereinafter described in detail by way of Examples, but these Examples are not to be construed as being limiting in any way the invention.

EXAMPLE 1

The fuel cell as illustrated in FIG. 1 was produced.

The first cathode catalyst layer 18 was formed in the following manner.

As the cathode catalyst, electrically conductive carbon particles with a mean primary particle size of 30 nm carrying Pt having a mean particle size of 3 nm was used. As the conductive carbon particles, carbon black (Ketjen black EC available from Mitsubishi Chemical Corporation) was used. The Pt content was set to 50% by weight of the total weight of the conductive carbon particles and the Pt.

The cathode catalyst was ultrasonically dispersed in an aqueous solution of isopropanol, and the resultant dispersion was admixed with an aqueous solution containing 5% by weight of polymer electrolyte and stirred with a disper. The dispersion thus obtained was diluted with an aqueous solution of isopropanol and then ultrasonically dispersed, thereby to prepare an ink for first cathode catalyst layer. The weight ratio of the Pt catalyst particles to the polymer electrolyte in the ink for first cathode catalyst layer was set to 3:2. As the polymer electrolyte, perfluorocarbonsulfonic acid ionomer (Flemion available from Asahi Glass Co., Ltd.) was used.

Next, with the use of the spray coater 70 illustrated in FIG. 6, the prepared catalyst ink was applied twenty four times onto a portion corresponding to the power generation region (6 cm×6 cm), thereby to form the first cathode catalyst layer 18 as illustrated in FIG. 3 on the electrolyte membrane 10. As the electrolyte membrane 10, a perfluoroalkylsulfonic acid ion-exchange membrane (Nafion 112 available from E. I. du Pont de Nemours and Company) with a size of 12 cm×12 cm was used.

The spray coating conditions were that: the center-to-center distance between portions adjacent to each other to be coated with the cathode catalyst ink 72 ejected from the spray gun 73 in their width directions was 10 mm; and the start position of the next spray coating was shifted in the direction along the X axis by 1 mm (an offset of 1 mm) from the previous coating. The spray gun 73 was moved at a rate of 40 mm/sec. As the jet gas, nitrogen gas was used. The jet pressure of the jet gas was set to 0.20 MPa. The surface temperature of the electrolyte membrane 10 at the time of spray coating was adjusted to 60° C.

The catalyst content per unit area in the first cathode catalyst layer 18 was 1.2 mg/cm$^2$. Here, the catalyst content per unit area is a value obtained by dividing the Pt catalyst content in the first cathode catalyst layer by the area (the projected area) of the first cathode catalyst layer calculated from the contour thereof as seen in the direction normal to the main surface of the first cathode catalyst layer. This applies to the following description.

The cathode diffusion layer 19 was formed in the following manner.

As the conductive porous substrate, a carbon felt (GDL10AA available from SGL Carbon Japan Co., Ltd.) was used. The conductive porous substrate was immersed for 1 minute in a 15% by weight dispersion of polytetrafluoroethylene (PTFE) resin containing a surfactant (a dispersion prepared by diluting D-1E available from Daikin Industries, Ltd. with ion-exchange water), and then dried for 3 hours at room temperature in air. Subsequently, the conductive porous substrate was baked for 1 hour at 360° C. in nitrogen gas to remove the surfactant adhered onto the conductive porous substrate. In such a manner, the conductive porous substrate was imparted with water repellency. The PTFE content in the conductive porous substrate was 20% by weight of the total weight of the conductive porous substrate and the PTFE.

The intermediate layer 32 was formed in the following manner.

First, the porous composite layer 34 was formed on portions of the surface of the conductive porous substrate facing the midstream and downstream portions of the fuel flow channel in the following manner.

An electrically conductive carbon black (VulcanXC-72R available from Cabot Corporation) was ultrasonically dispersed in an aqueous solution admixed with a surfactant (Triton X-100 available from Aldrich Chemical Co., Inc.). The resultant dispersion was subjected to high dispersion treatment using a kneader (HIVIS MIX (trade name) available from PRIMIX Corporation). Subsequently, to the resultant dispersion, a PTFE dispersion (D-1E available from Daikin Industries, Ltd.) was added, and then subjected again to high dispersion treatment, thereby to prepare a paste for porous composite layer.

The paste for porous composite layer thus prepared was uniformly applied using a doctor blade onto the portions of the surface of the conductive porous substrate facing the midstream and downstream portions of the fuel flow channel 20, and dried for 6 hours at room temperature in air. Thereafter, the resultant dried body was baked for 1 hour at 360° C. in nitrogen gas to remove the surfactant. The porous composite layer 34 was thus formed. In the porous composite layer 34 thus formed, the weight ratio of the conductive carbon black to the PTFE was 5:3.

The total content of the hydrophobic material (PTFE) and the electron-conductive material (conductive carbon black) per unit area in the porous composite layer 34 was 1.8 mg/cm$^2$. Here, the total content of the hydrophobic material and the electron-conductive material per unit area in the porous composite layer 34 is a value obtained by dividing the total content of the above two materials in the porous composite layer by the area (the projected area) of the porous composite layer calculated from the contour thereof as seen in the direction normal to the main surface of the porous composite layer.

Next, the second cathode catalyst layer 33 was formed on a portion of the surface of the conductive porous substrate facing the upstream portion of the fuel flow channel 20 in the following manner.

As the cathode catalyst to be contained in the second cathode catalyst layer, electrically conductive carbon particles with a mean primary particle size of 30 nm carrying Pt having a mean particle size of 3 nm was used. As the conductive carbon particles, carbon black (Ketjen black EC available from Mitsubishi Chemical Corporation) was used. The Pt content was set to 50% by weight of the total weight of the conductive carbon particles and the Pt.

The cathode catalyst was ultrasonically dispersed in an aqueous solution of isopropanol, and the resultant dispersion was admixed with an aqueous solution containing 5% by weight of polymer electrolyte. The resultant dispersion was stirred with a disper, thereby to prepare an ink for second cathode catalyst layer. Here, the weight ratio of the Pt catalyst particles to the polymer electrolyte in the ink for second cathode catalyst layer was set to 3:2. As the polymer electrolyte, perfluorocarbonsulfonic acid ionomer (Flemion available from Asahi Glass Co., Ltd.) was used.

The paste for second cathode catalyst layer thus prepared was uniformly applied using a doctor blade onto the portion of the surface of the conductive porous substrate facing the upstream portion of the fuel flow channel, and dried for 12 hours at room temperature in air. The second cathode catalyst layer 33 was thus formed. In the second cathode catalyst layer 33 thus formed, the catalyst content per unit area in the second cathode catalyst layer 33 was 0.6 mg/cm$^2$.

The anode diffusion layer 17 was formed in the following manner.

As the conductive porous substrate, a carbon paper (TGP-H090 available from Toray Industries, Inc.) was used. The conductive porous substrate was immersed for 1 minute in a 7% by weight dispersion of polytetrafluoroethylene (PTFE) resin containing a surfactant (a dispersion prepared by diluting D-1E available from Daikin Industries, Ltd. with ion-exchange water), and then dried for 3 hours at room temperature in air. Subsequently, the conductive porous substrate was baked for 1 hour at 360° C. in nitrogen gas to remove the surfactant adhered onto the conductive porous substrate. The PTFE content in the conductive porous substrate was 12% by weight of the total weight of the conductive porous substrate and the PTFE.

Next, the paste for porous composite layer used for forming the intermediate layer included in the cathode was uniformly applied onto the surface of the aforementioned conductive porous substrate, and dried for 6 hours at room temperature in air. Thereafter, the resultant dried body including the paste was baked for 1 hour at 360° C. in nitrogen gas to remove the surfactant from the dried body. The anode diffusion layer including the conductive porous substrate and the porous composite layer carried thereon was thus formed.

The weight ratio of the conductive carbon black to the PTFE in the porous composite layer thus formed was 5:3. The total content of the hydrophobic material (PTFE) and the electron-conductive material (conductive carbon black) per unit area in the porous composite layer was 2.2 mg/cm$^2$.

The anode catalyst layer 16 was formed in the following manner.

As the anode catalyst, Pt—Ru alloy fine particles (weight ratio of Pt:Ru=2:1) having a mean particle size of 3 nm was used. The anode catalyst was ultrasonically dispersed in an aqueous solution of isopropanol, and the resultant dispersion was admixed with an aqueous solution containing 5% by weight of polymer electrolyte. The resultant dispersion was subjected to high dispersion treatment using a bead mill, thereby to prepare an anode catalyst ink. The weight ratio of the Pt—Ru alloy fine particles to the polymer electrolyte in the anode catalyst ink was set to 2:1. As the polymer electrolyte, perfluorocarbonsulfonic acid ionomer (Flemion available from Asahi Glass Co., Ltd.) was used.

Next, onto the surface of the electrolyte membrane 10 opposite the surface on which the first cathode catalyst layer 18 was formed, the anode catalyst ink was applied using a doctor blade such that the ink-applied surface faces the first cathode catalyst layer 18 with the electrolyte membrane 10 interposed therebetween, and then dried, whereby the anode catalyst layer 16 was formed. The size of the anode catalyst layer 16 was set to 6 cm×6 cm. The catalyst content per unit area in the anode catalyst layer 16 was 6.4 mg/cm$^2$. Here, the catalyst content per unit area in the anode catalyst layer is a value obtained by dividing the catalyst content in the anode catalyst layer by the area (the projected area) of the anode catalyst layer calculated from the contour thereof as seen in the direction normal to the main surface of the anode catalyst layer.

Onto the first cathode catalyst layer 18 in the membrane-catalyst layer assembly (i.e., the catalyst coated membrane (CCM)) thus obtained, the cathode diffusion layer 19 carrying the intermediate layer on one surface thereof was laminated such that the intermediate layer was brought into contact with the first cathode catalyst layer 18. Onto the anode catalyst layer 16, the anode diffusion layer 17 was laminated. The sizes of the cathode diffusion layer 19, the intermediate layer, and the anode diffusion layer 17 were respectively 6 cm×6 cm.

The resultant laminate was subjected to hot pressing (at 130° C. and 4 MPa for 3 minutes), thereby to bond the catalyst layers and the diffusion layers together. The anode 11 and the cathode 12 were thus obtained.

Next, the gaskets 22 and 23 were thermally adhered (at 130° C. and 4 MPa for 5 minutes) around the anode 11 and the cathode 12, respectively, so as to sandwich the electrolyte membrane 10, thereby to form the membrane-electrode assembly (MEA) 13. As the gasket, a three-layer structure gasket composed of a polyetherimide layer serving as a center layer and silicone rubber layers sandwiching the center layer was used.

The MEA 13 thus formed was sandwiched between the separators 14 and 15, the current collector plates 24 and 25, the sheet heaters 26 and 27, the insulator plates 28 and 29, and the end plates 30 and 31, each of which had outer dimensions of 12 cm×12 cm, and then secured with clamping rods. The clamping pressure was set to 12 kgf/cm$^2$ per area of the separator.

As the separators 14 and 15, a resin-impregnated graphite material of 4 mm in thickness (G347B available from Tokai Carbon Co., Ltd.) was used. The separators 14 and 15 had been provided with the serpentine flow channels 20 and 21, respectively, the flow channels each having a width of 1.5 mm and a depth of 1 mm. As the current collector plates 24 and 25, a gold-plated stainless steel plate was used. As the sheet heaters 26 and 27, SAMICONE heater (available from Sakaguchi E.H VOC Corp.) was used.

The direct oxidation fuel cell produced in the manner as described above was referred to as Fuel cell A.

EXAMPLE 2

A fuel cell including a cathode as illustrated in FIG. 4 was produced.

The intermediate layer 50 was formed in the following manner.

First, on the surface of the same conductive porous substrate having been subjected to water-repellent treatment as used in Example 1, the porous composite layer 52 was formed. In this embodiment also, the same paste of porous composite layer as used in Example 1 was used.

Specifically, onto the portions of the surface of the conductive porous substrate facing the midstream and downstream portions of the fuel flow channel, the paste for porous composite layer was uniformly applied using a doctor blade and then dried for 2 hours at room temperature in air.

Thereafter, onto the portions of the conductive porous substrate facing the downstream half of the midstream portion and the downstream portion of the fuel flow channel, the paste for porous composite layer was reapplied using a doctor blade and then dried for 2 hours at room temperature in air.

Further, onto the portion of the conductive porous substrate facing the downstream portion of the fuel flow channel, the paste for porous composite layer was further reapplied using a doctor blade and then dried for 2 hours at room temperature in air.

Finally, the dried body thus obtained was baked for 1 hour at 360° C. in nitrogen gas to remove the surfactant included in the dried body. The porous composite layer 52 was thus formed.

In the resultant porous composite layer 52, the total content of the hydrophobic material (PTFE) and the electron conductive material (conductive carbon black) per unit area in each portion was as follows.

In the portion facing the upstream half of the midstream portion of the fuel flow channel (i.e., the first midstream portion): 0.8 mg/cm$^2$ In the portion facing the downstream half of the midstream portion of the fuel flow channel (i.e., the second midstream portion): 1.2 mg/cm$^2$ In the downstream portion: 1.6 mg/cm$^2$ Next, the second cathode catalyst layer 51 was formed in the following manner. In this example also, the same ink for second cathode catalyst layer as used in Example 1 was used.

First, onto the portion of the surface of the conductive porous substrate facing the upstream portion of the fuel flow channel, the paste for second cathode catalyst layer was uniformly applied using a doctor blade and then dried for 12 hours at room temperature in air. The catalyst content per unit area in the catalyst layer thus formed was 0.6 mg/cm$^2$.

Thereafter, onto the portions of the formed porous composite layer facing the midstream and downstream portions of the fuel flow channel, the second cathode catalyst layer was formed using the spray coater as illustrated in FIG. 6.

First, the ink for second cathode catalyst layer was diluted with an aqueous solution of isopropanol, and then the diluted ink was subjected to ultrasonic dispersion. The ink thus prepared was applied four times onto the portions of the porous composite layer corresponding to the midstream and downstream portions of the fuel flow channel. Subsequently, the ink was reapplied two times onto the portion of the porous composite layer facing the midstream portion of the fuel flow channel. Finally, the ink was further reapplied two times onto the portion of the porous composite layer facing the upstream half of the midstream portion of the fuel flow channel. The second cathode catalyst layer 51 was thus formed.

In the obtained second cathode catalyst layer 51, the catalyst content per unit area in each portion was as follows.

In the upstream portion: 0.6 mg/cm$^2$
In the first midstream portion: 0.4 mg/cm$^2$
In the second midstream portion: 0.3 mg/cm$^2$
In the downstream portion: 0.2 mg/cm$^2$ In the manner as describe above, the intermediate layer was formed, in which the catalyst content per unit area in the second cathode catalyst layer was decreased stepwise from the upstream side toward the downstream side of the fuel flow channel, and the total content of the hydrophobic material and the electron conductive material per unit area in the porous composite layer 52 was increased stepwise from the midstream side toward the downstream side of the fuel flow channel.

Fuel cell B was produced in the same manner as in Example 1 except the above.

EXAMPLE 3

A fuel cell including a cathode as illustrated in FIG. 5 was produced.

The intermediate layer 60 was formed in the following manner.

First, on the surface of the same conductive porous substrate having been subjected to water-repellent treatment as used in Example 1, the porous composite layer 62 was formed. In this embodiment also, the same paste of porous composite layer as used in Example 1 was used.

Specifically, onto the portions of the surface of the conductive porous substrate facing the upstream, midstream and downstream portions of the fuel flow channel, the paste for porous composite layer was uniformly applied using a doctor blade and then dried for 2 hours at room temperature in air.

Thereafter, onto the portions of the conductive porous substrate facing the midstream and downstream portions of the fuel flow channel, the paste was reapplied using a doctor blade and then dried for 2 hours at room temperature in air.

Subsequently, onto the portions of the conductive porous substrate facing the downstream half of the midstream portion and the downstream portion of the fuel flow channel, the paste for porous composite layer was further reapplied using a doctor blade and then dried for 2 hours at room temperature in air.

Further, onto the portion of the conductive porous substrate facing the downstream portion of the fuel flow channel, the paste for porous composite layer was further reapplied using a doctor blade and then dried for 2 hours at room temperature in air.

Finally, the dried body including the paste thus obtained was baked for 1 hour at 360° C. in nitrogen gas to remove the surfactant included in the dried body. The porous composite layer 62 was thus formed.

In the resultant porous composite layer 62, the total content of the hydrophobic material and the electron conductive material per unit area in each portion was as follows.

In the upstream portion: 0.4 mg/cm$^2$
In the first midstream portion: 0.8 mg/cm$^2$
In the second midstream portion: 1.2 mg/cm$^2$
In the downstream portion: 1.6 mg/cm$^2$ Next, the second cathode catalyst layer 61 was formed in the following manner. In this example, the same ink for second cathode catalyst layer as used in Example 1 was diluted with an aqueous solution of isopropanol, and the diluted ink was subjected to ultrasonic dispersion. The ink thus obtained was used as the ink for second cathode catalyst layer.

First, onto the portions of the formed porous composite layer facing the upstream, midstream, and downstream portions of the fuel flow channel, the ink for second cathode catalyst layer was applied four times using the spray coater as illustrated in FIG. 6. Subsequently, onto the portions of the porous composite layer facing the upstream and midstream portions of the fuel flow channel, the ink was further reapplied two times. Thereafter, onto the portions of the porous composite layer facing the upstream portion and the upstream half of the midstream portion of fuel flow channel, the ink was further reapplied two times. Finally, onto the portion of the porous composite layer facing the upstream portion of fuel flow channel, the ink was further reapplied two times. The second cathode catalyst layer 61 was thus formed.

In the resultant second cathode catalyst layer 61, the catalyst content per unit area in each portion was as follows.

In the upstream portion: 0.5 mg/cm$^2$
In the first midstream portion: 0.4 mg/cm$^2$
In the second midstream portion: 0.3 mg/cm$^2$
In the downstream portion: 0.2 mg/cm$^2$ In the manner as describe above, the intermediate layer was formed, in which the catalyst content per unit area in the second cathode catalyst layer was decreased stepwise from the upstream side toward the downstream side of the fuel flow channel, and the total content of the hydrophobic material and the electron conductive material per unit area in the porous composite layer was increased stepwise from the upstream side toward the downstream side of the fuel flow channel.

Fuel cell C was produced in the same manner as in Example 1 except the above.

COMPARISON EXAMPLE 1

Comparative fuel cell 1 was produced in the same manner as in Example 1 except that: the porous composite layer was formed so as to be uniform in thickness in all portions of the surface of the conductive porous substrate facing the upstream, midstream, and downstream portions of the fuel flow channel; and the second cathode catalyst layer was not formed.

The total content of the hydrophobic material and the electron conductive material per unit area in the porous composite layer was 1.8 mg/cm$^2$.

COMPARATIVE EXAMPLE 2

Comparative fuel cell 2 was produced in the same manner as in Comparative Example 1 except that the first cathode catalyst ink was applied thirty six times in forming the first cathode catalyst layer.

The catalyst content per unit area in the first cathode catalyst layer was 1.8 mg/cm$^2$. The total content of the hydrophobic material and the electron conductive material per unit area in the porous composite layer was 1.8 mg/cm$^2$.

The porosity of each portion of the second cathode catalyst layer included in the fuel cells of Examples 1 to 3 and Comparative Examples 1 to 2 was measured in the following manner.

A catalyst layer sample was formed on a polytetrafluoroethylene (PTFE) sheet (Naflon PTFE sheet available from NICHIAS Corporation) using the same catalyst ink under the same application conditions as those in forming the each portion. The porosity distribution of the catalyst layer sample was measured by a mercury intrusion method, and from the measured data, the porosity of each portion of the catalyst layer was determined.

As to the first cathode catalyst layer, the porosity thereof was measured in the same manner as described above.

The results are shown in Table 1.

As to the porous composite layer, the porosity of each portion thereof was measured in the same manner as described above. The results are shown in Table 1.

In Table 1, the catalyst content in each portion of the first and second cathode catalyst layers 18 and 33, and the total content of the hydrophobic material and the electron-conductive material in each portion of the porous composite layer are also shown.

TABLE 1

| | | First catalyst layer | | Intermediate layer | | Porous composite layer | |
|---|---|---|---|---|---|---|---|
| | | | | Second catalyst layer | | Total content of hydrophobic material and electron-conductive material (mg/cm$^2$) | |
| | | Catalyst content (mg/cm$^2$) | Porosity (%) | Catalyst content (mg/cm$^2$) | Porosity (%) | | Porosity (%) |
| Fuel cell A | Upstream portion | 1.2 | 82 | 0.6 | 74 | — | — |
| | 1st midstream portion | | | — | — | 1.8 | 68 |
| | 2nd midstream portion | | | — | — | 1.8 | 68 |
| | Downstream portion | | | — | — | 1.8 | 68 |
| Fuel cell B | Upstream portion | 1.2 | 82 | 0.6 | 74 | — | — |
| | 1st midstream portion | | | 0.4 | 88 | 0.8 | 68 |
| | 2nd midstream portion | | | 0.3 | 88 | 1.2 | 68 |
| | Downstream portion | | | 0.2 | 88 | 1.6 | 68 |
| Fuel cell C | Upstream portion | 1.2 | 82 | 0.5 | 88 | 0.4 | 68 |

TABLE 1-continued

| | | First catalyst layer | | Second catalyst layer | | Porous composite layer | |
|---|---|---|---|---|---|---|---|
| | | | | Intermediate layer | | | |
| | | Catalyst content (mg/cm²) | Porosity (%) | Catalyst content (mg/cm²) | Porosity (%) | Total content of hydrophobic material and electron-conductive material (mg/cm²) | Porosity (%) |
| | 1st midstream portion | | | 0.4 | 88 | 0.8 | 68 |
| | 2nd midstream portion | | | 0.3 | 88 | 1.2 | 68 |
| | Downstream portion | | | 0.2 | 88 | 1.6 | 68 |
| Com. fuel cell 1 | All portions | 1.2 | 82 | — | — | 1.8 | 68 |
| Com. fuel cell 2 | All portions | 1.8 | 82 | — | — | 1.8 | 68 |

[Evaluation]

Fuel cells A to C produced in Examples 1 to 3 and Comparative fuel cells 1 to 2 produced in Comparative Examples 1 to 2 were evaluated in the manner as described below.

Each of the fuel cells was operated continuously at a constant voltage of 0.4 V while supplying an aqueous 4M methanol solution to the anode at a flow rate of 0.27 cc/min and air to the cathode at a flow rate of 0.26 L/min, during which the cell temperature was set to 60° C.

From the current density measured 4 hours after the start of operation, the power density was calculated as an "initial power density." Thereafter, from the current density measured 2000 hours after the start of operation, the power density was calculated.

The ratio of the power density after the passage of 2000 hours to the initial power density was determined as a "power density retention rate." The results thus obtained are shown in Table 2. In Table 2, the power density retention rate is expressed as percentage.

TABLE 2

| | Initial power density (mW/cm²) | Power retention rate (%) |
|---|---|---|
| Fuel cell A | 78 | 96 |
| Fuel cell B | 80 | 98 |
| Fuel cell C | 82 | 99 |
| Com. fuel cell 1 | 66 | 78 |
| Com. fuel cell 2 | 74 | 64 |

As shown in Table 2, the power density retention rates of Fuel cells A to C were extremely high. In the invention, instead of increasing the catalyst reaction sites throughout the entire cathode-side power generation region, an additional catalyst layer, namely, the second cathode catalyst layer, is provided on the conventional catalyst layer (the first cathode catalyst layer) particularly in the portion of the power generation region, the portion facing the upstream portion of the fuel channel where the amount of MCO is large. As such, the number of catalyst reaction sites required for allowing the oxygen reduction reaction and the crossover methanol oxidation reaction to proceed simultaneously can be ensured. Moreover, the porous composite layer is further provided in at least portions of the cathode-side power generation region facing the midstream and downstream portions of the fuel flow channel. Because of this configuration, the first cathode catalyst layer and the cathode diffusion layer have an improved interface bonding therebetween. As a result, the accumulation of a large amount of water between the first cathode catalyst layer and the cathode diffusion layer can be prevented, which can improve the oxidant permeability and the ability of draining water. Presumably for this reason, the cathodic overvoltage was reduced and the durability of the fuel cell was improved.

Among Fuel cells A to C, Fuel cells B and C had remarkably improved durability. In Fuel cells B and C, the catalyst content in the second cathode catalyst layer is decreased from the upstream side toward the downstream side of the fuel flow channel, and the total content of the materials included in the porous composite layer is increased from the upstream side toward the downstream side of the fuel flow channel. As such, in Fuel cells B and C, an appropriate number of catalyst reaction sites are present in the second cathode catalyst layer depending on the amount of MCO, and in particular in the portions of the cathode-side power generation region facing the midstream and downstream portions of the fuel flow channel, the supply of oxidant and draining of water to and from a deep portion of the first cathode catalyst layer can be improved. Presumably for this reason, in Fuel cells B and C, the cathodic overvoltage was further reduced.

On the other hand, the power density retention rates of Comparative fuel cells 1 to 2 were extremely low as compared with those of Fuel cells A to C. In Comparative fuel cell 1, the second cathode catalyst layer is not provided. Presumably for this reason, in the portion of the cathode-side power generation region facing the upstream portion of the fuel flow channel where the amount of MCO was large, the catalyst reaction sites became insufficient in number and the oxidant permeability was deteriorated, and as a result, the durability was deteriorated.

In Comparative fuel cell 2, the catalyst content in the first cathode catalyst layer was uniformly increased throughout the entire first cathode catalyst layer. In this configuration, in the portion of the cathode-side power generation region facing the upstream portion of the fuel flow channel, a sufficient amount of catalyst is present; however, because of a large total content of the hydrophobic material and the electron-conductive material per unit area of the porous composite layer, the permeability of oxidant through the first cathode catalyst layer will deteriorate. As a result, the catalyst reaction sites will fail to function effectively. Moreover, in the portions of the cathode-side power generation region facing the midstream and downstream portions of the fuel flow channel where the amount of MCO is comparatively small, the catalyst is present in excess, which will inhibit the smooth supply of oxidant and smooth draining of water to and from a deep portion of the first cathode catalyst layer. Presumably as a result, the durability was deteriorated.

The direct oxidation fuel cell of the invention is excellent in power generating performance and durability, thus being useful, for example, as the power source for mobile small electronic devices such as cellular phones, notebook personal computers, and digital still cameras. Further, the direct oxidation fuel cell of the invention is also useful as the power source for electric scooters, automobiles, and the like.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising at least one unit cell, the unit cell comprising: a membrane-electrode assembly including an anode, a cathode, and an electrolyte membrane interposed between the anode and the cathode; an anode-side separator being in contact with the anode; and a cathode-side separator being in contact with the cathode, wherein
the anode-side separator has a fuel flow channel for supplying fuel to the anode;
the cathode-side separator has an oxidant flow channel for supplying oxidant to the cathode;
the cathode includes a first cathode catalyst layer being in contact with the electrolyte membrane, a cathode diffusion layer being in contact with the cathode-side separator, and an intermediate layer disposed between the first cathode catalyst layer and the cathode diffusion layer;
the intermediate layer includes a second cathode catalyst layer being in contact with the first cathode catalyst layer and a porous composite layer being in contact with the cathode diffusion layer, the porous composite layer containing a hydrophobic material and an electron-conductive material; and
at least a portion of the intermediate layer facing an upstream portion of the fuel flow channel includes the second cathode catalyst layer, and at least portions of the intermediate layer facing midstream and downstream portions of the fuel flow channel include the porous composite layer.

2. The direct oxidation fuel cell in accordance with claim 1, wherein the portion of the intermediate layer facing the upstream portion of the fuel flow channel includes only the second cathode catalyst layer, and the portions of the intermediate layer facing the midstream and downstream portions of the fuel flow channel include only the porous composite layer.

3. The direct oxidation fuel cell in accordance with claim 1, wherein
the portion of the intermediate layer facing the upstream portion of the fuel flow channel includes only the second cathode catalyst layer, the portions of the intermediate layer facing the midstream and downstream portions of the fuel flow channel further include the second cathode catalyst layer, and a catalyst content in the second cathode catalyst layer is decreased from an upstream side toward a downstream side of the fuel flow channel; and
the total content of the hydrophobic material and the electron-conductive material in the porous composite layer is increased from a midstream side toward the downstream side of the fuel flow channel.

4. The direct oxidation fuel cell in accordance with claim 1, wherein
the portions of the intermediate layer facing the upstream, midstream and downstream portions of the fuel flow channel includes the second cathode catalyst layer and the porous composite layer; and
the catalyst content in the second cathode catalyst layer is decreased from an upstream side toward a downstream side of the fuel flow channel, and the total content of the hydrophobic material and the electron-conductive material contained in the porous composite layer is increased from the upstream side toward the downstream side of the fuel flow channel.

5. The direct oxidation fuel cell in accordance with claim 1, wherein the catalyst content per unit area in the second cathode catalyst layer is smaller than the catalyst content per unit area in the first cathode catalyst layer.

6. The direct oxidation fuel cell in accordance with claim 1, wherein the porosity of the second cathode catalyst layer is greater than the porosity of the first cathode catalyst layer.

7. The direct oxidation fuel cell in accordance with claim 1, wherein the hydrophobic material includes fluorocarbon resin.

8. The direct oxidation fuel cell in accordance with claim 1, wherein the electron-conductive material includes an electrically conductive carbon black.

9. The direct oxidation fuel cell in accordance with claim 1, wherein the cathode diffusion layer includes an electrically conductive porous substrate, and the intermediate layer is directly formed on the electrically conductive porous substrate.

* * * * *